US012513791B2

(12) United States Patent
Storiz et al.

(10) Patent No.: US 12,513,791 B2
(45) Date of Patent: Dec. 30, 2025

(54) METHOD AND APPARATUS FOR PROCESSING FOOD PRODUCT MASS ALTERATION DURING A COOKING PROCESS INVOLVING RF APPLICATION

(71) Applicant: ILLINOIS TOOL WORKS INC., Glenview, IL (US)

(72) Inventors: Paul Storiz, Glenview, IL (US); Christopher Hopper, Buffalo Grove, IL (US); Daniele Chirico, Brugherio (IT); Dionysios Tsiogkas, Des Plaines, IL (US); Joshua Linton, Winnetka, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 740 days.

(21) Appl. No.: 17/953,754

(22) Filed: Sep. 27, 2022

(65) Prior Publication Data

US 2023/0133013 A1  May 4, 2023

Related U.S. Application Data

(60) Provisional application No. 63/274,079, filed on Nov. 1, 2021.

(51) Int. Cl.
*H05B 6/64* (2006.01)
*H05B 6/68* (2006.01)

(52) U.S. Cl.
CPC ......... *H05B 6/6464* (2013.01); *H05B 6/6435* (2013.01); *H05B 6/6473* (2013.01); *H05B 6/686* (2013.01)

(58) Field of Classification Search
CPC ............. F25B 2600/112; H05B 6/6435; H05B 6/6464; H05B 6/6473; H05B 6/686
(Continued)

(56) References Cited

U.S. PATENT DOCUMENTS 6,867,399 B2 * 3/2005 Muegge ................ F24C 15/325
219/685
6,987,252 B2 * 1/2006 Graves ................ H05B 6/6473
219/400

(Continued)

FOREIGN PATENT DOCUMENTS

EP       0432080 B1    8/1994
EP       1991813 B1    9/2011

OTHER PUBLICATIONS

Extended European Search Report of corresponding European Application No. 22200190.1 mailed Mar. 21, 2023.

*Primary Examiner* — Quang T Van
(74) *Attorney, Agent, or Firm* — Burr & Forman

(57) ABSTRACT

An oven may include a cooking chamber configured to receive a first food product, a convective heating system configured to provide heated air into the cooking chamber, a radio frequency (RF) heating system configured to provide RF energy into the cooking chamber, and processing circuitry configured to execute a recipe defining cooking parameters for cooking the first food product. The cooking parameters may define operational settings for the convective heating system and the RF heating system and a nominal cooking time for a first batch including the first food product. The processing circuitry may be operably coupled to a mass adjustment module configured to determine, based on an indication of an addition of a second batch comprising a second food product to the cooking chamber, an overlap period during which the first and second food products are simultaneously cooked and a completion time for cooking the second food product after the overlap period.

20 Claims, 10 Drawing Sheets

(58) Field of Classification Search
USPC ........ 219/678, 679, 680, 681, 685, 725, 745
See application file for complete search history.

(56) References Cited

U.S. PATENT DOCUMENTS 8,835,816 B2    9/2014   McIntyre et al.
2018/0152999 A1*   5/2018   Rollet .................. H05B 6/6435

* cited by examiner

METHOD AND APPARATUS FOR PROCESSING FOOD PRODUCT MASS ALTERATION DURING A COOKING PROCESS INVOLVING RF APPLICATION

TECHNICAL FIELD

Example embodiments generally relate to ovens and, more particularly, relate to an oven that uses radio frequency (RF) heating and yet is able to accurately handle alterations to the food product mass during a cooking process.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality. More recently, ovens with improved capabilities relative to cooking food with a combination of controllable RF energy and convection energy have been introduced. Unlike the relatively indiscriminate bombarding of food product, which generally occurs in microwave cooking, the use of controllable RF energy can enable a much more fine-tuned control of the cooking process. This fine-tuned control of the cooking process can lead to superior results in vastly shortened time periods.

The improved speed and accuracy of cooking with RF can be advantageous in many contexts. However, in a typical situation, once a recipe involving RF application has begun, any introduction of additional mass into the cooking chamber during the execution of the cooking recipe will drastically affect the absorption characteristics of the RF, and all such improvements related to accuracy (and potentially also speed) may be lost. In this regard, for example, introduction of a second item into a normal oven at temperature in the middle of a cooking process for a first item will only slightly change the cooking process associated with the first and second items due to the slight temperature dip associated with opening the oven door. The second item does not otherwise "steal" any heat from the first item. However, when RF application is involved, the RF energy available will be split between the first and second items, and neither will cook at the speed otherwise expected.

Accordingly, it may be desirable to develop an oven capable of utilizing the advantages of RF cooking, but nevertheless be flexible enough to handle changes to the mass inside the cooking chamber during a cooking process.

BRIEF SUMMARY OF SOME EXAMPLES

In an example embodiment, an oven is provided. The oven may include a cooking chamber configured to receive a first food product, a convective heating system configured to provide heated air into the cooking chamber, a radio frequency (RF) heating system configured to provide RF energy into the cooking chamber, and processing circuitry configured to execute a recipe defining cooking parameters for cooking the first food product. The cooking parameters may define operational settings for the convective heating system and the RF heating system and a nominal cooking time for a first batch including the first food product. The processing circuitry may be operably coupled to a mass adjustment module configured to determine, based on an indication of an addition of a second batch comprising a second food product to the cooking chamber, an overlap period during which the first and second food products are simultaneously cooked and a completion time for cooking the second food product after the overlap period.

In another example embodiment, control electronics for controlling application of radio frequency (RF) energy generated using solid state electronic components and a convective heating system configured to provide heated air into a cooking chamber may be provided. The control electronics may include processing circuitry and a mass adjustment module. The processing circuitry may be configured to execute a recipe defining cooking parameters for cooking a first food product in the cooking chamber. The cooking parameters may define operational settings for the convective heating system and the RF heating system and a nominal cooking time for a first batch including the first food product. The mass adjustment module may be operably coupled to the processing circuitry and may be configured to determine, based on an indication of an addition of a second batch comprising a second food product to the cooking chamber, an overlap period during which the first and second food products are simultaneously cooked and a completion time for cooking the second food product after the overlap period.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
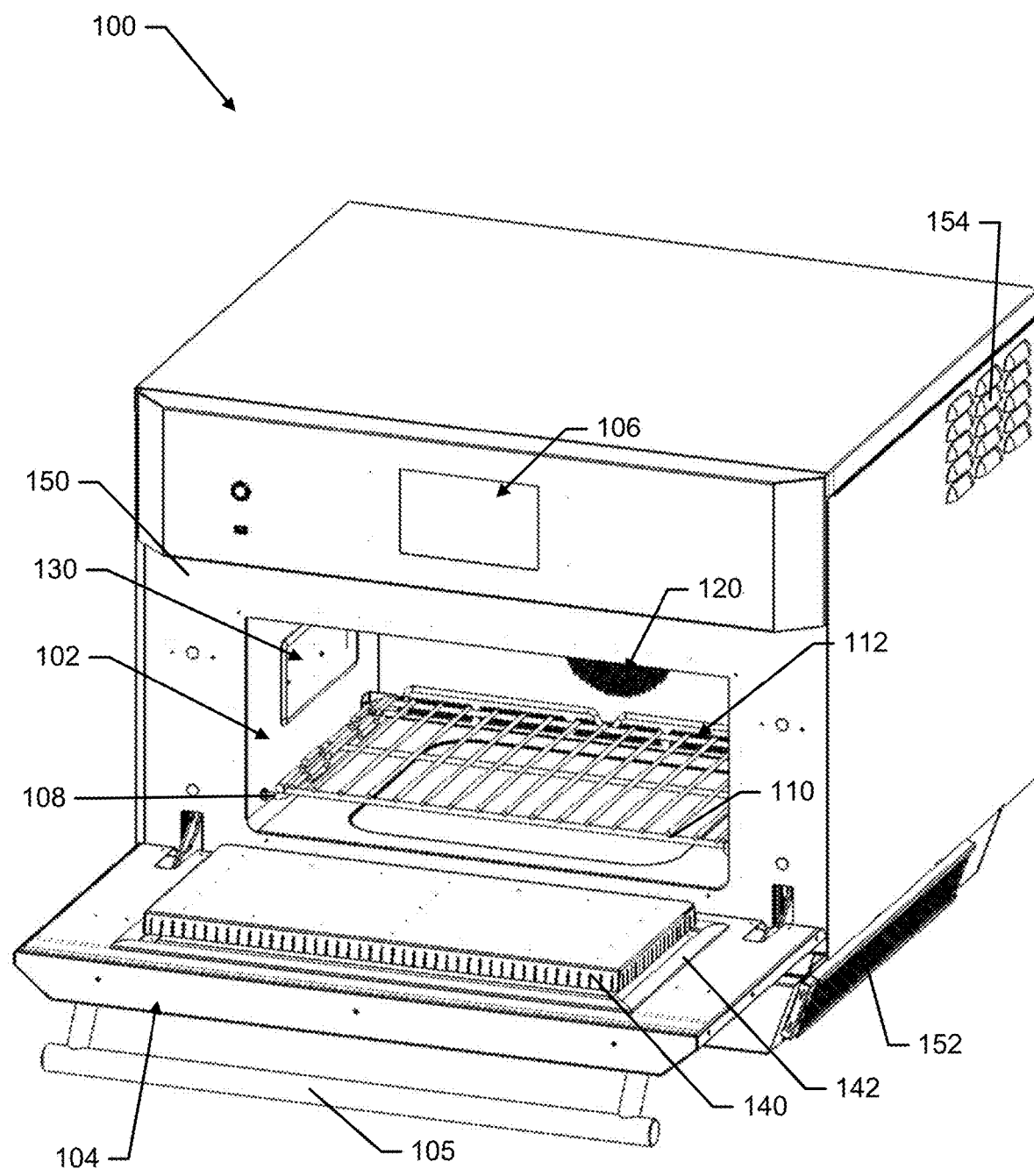
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, the oven may cook food relatively quickly and uniformly, based on the application of RF and convective energy under the instruction of control electronics that are configured to be able to adjust cooking times and separately track cooking processes for multiple items added to the cooking chamber at different times as described herein.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include one or multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished by convection. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
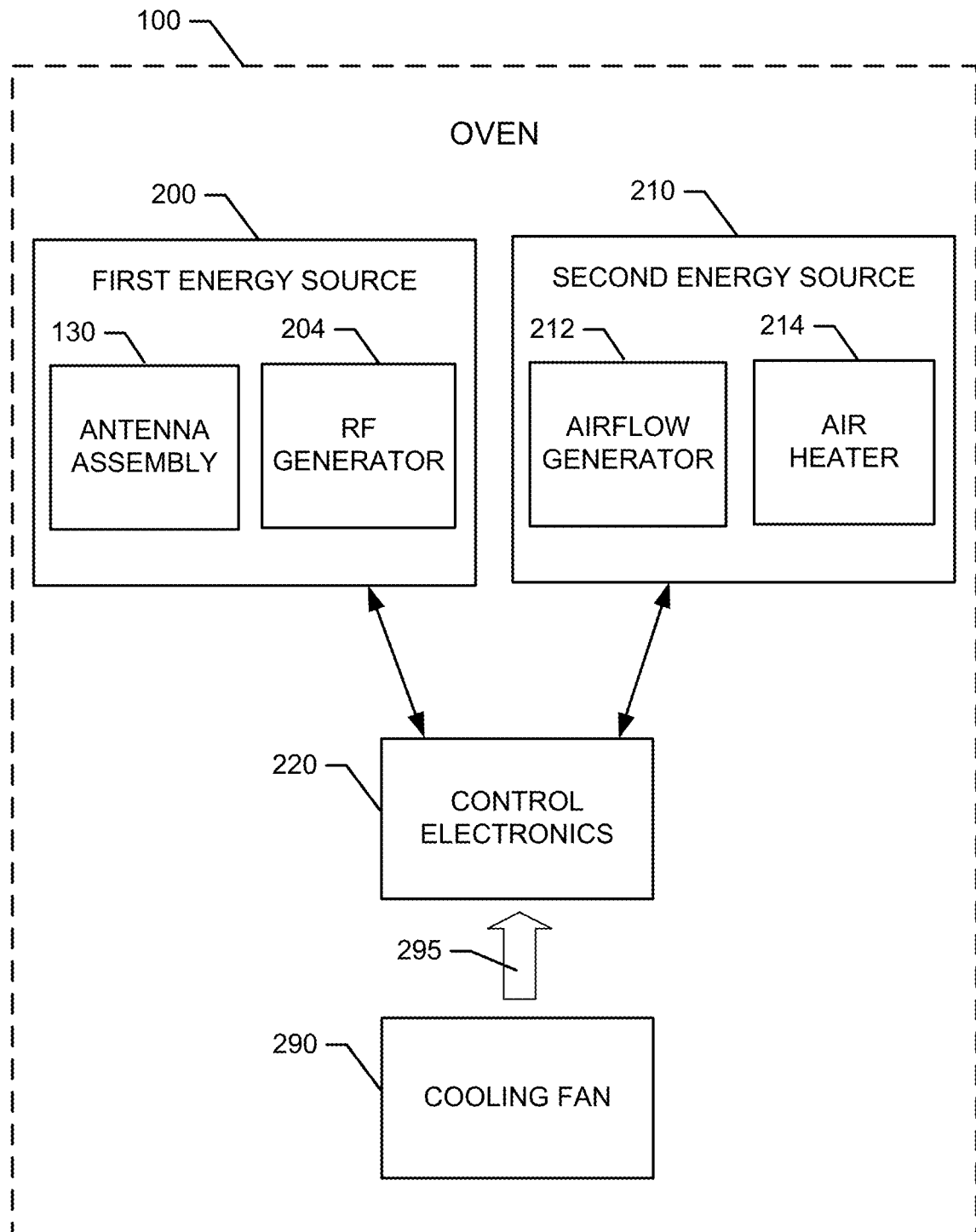
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from unlicensed frequency (e.g., the ISM) bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking programs or recipes may be provided to define the cooking parameters to be employed for each of multiple potential cooking stages or steps that may be defined for the food product and the control electronics 220 may be configured to access and/or execute the cooking programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. However, in other examples, the user may directly select a recipe for execution. The recipe may be descriptive of items to be cooked, and information about such items in their initial and/or final state (e.g., level of doneness). Meanwhile, the control electronics 220 may determine specific details regarding frequency, phase, temperature, fan speed, time, etc. However, the user may also provide some input regarding the details in some cases.

In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
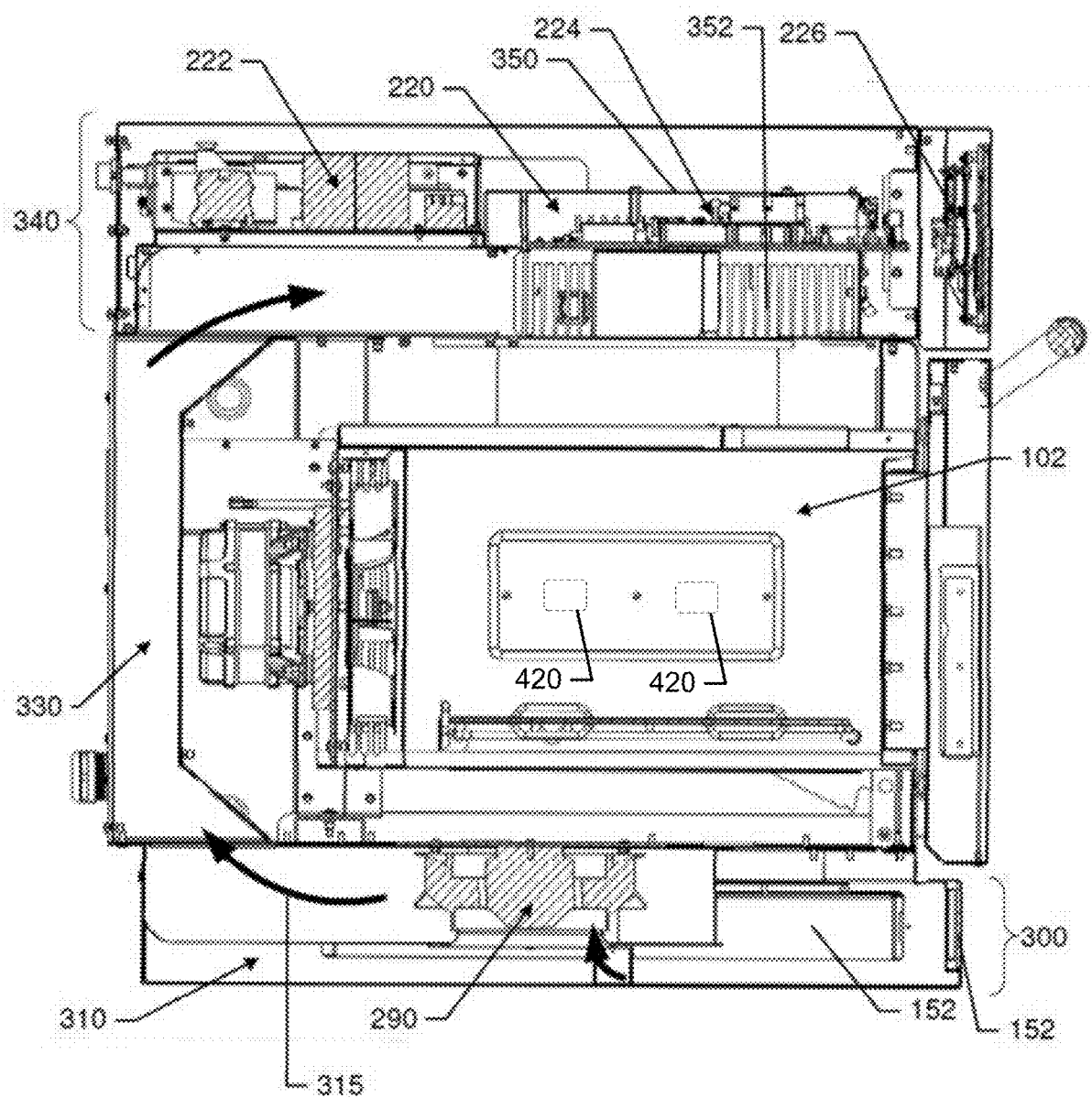
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
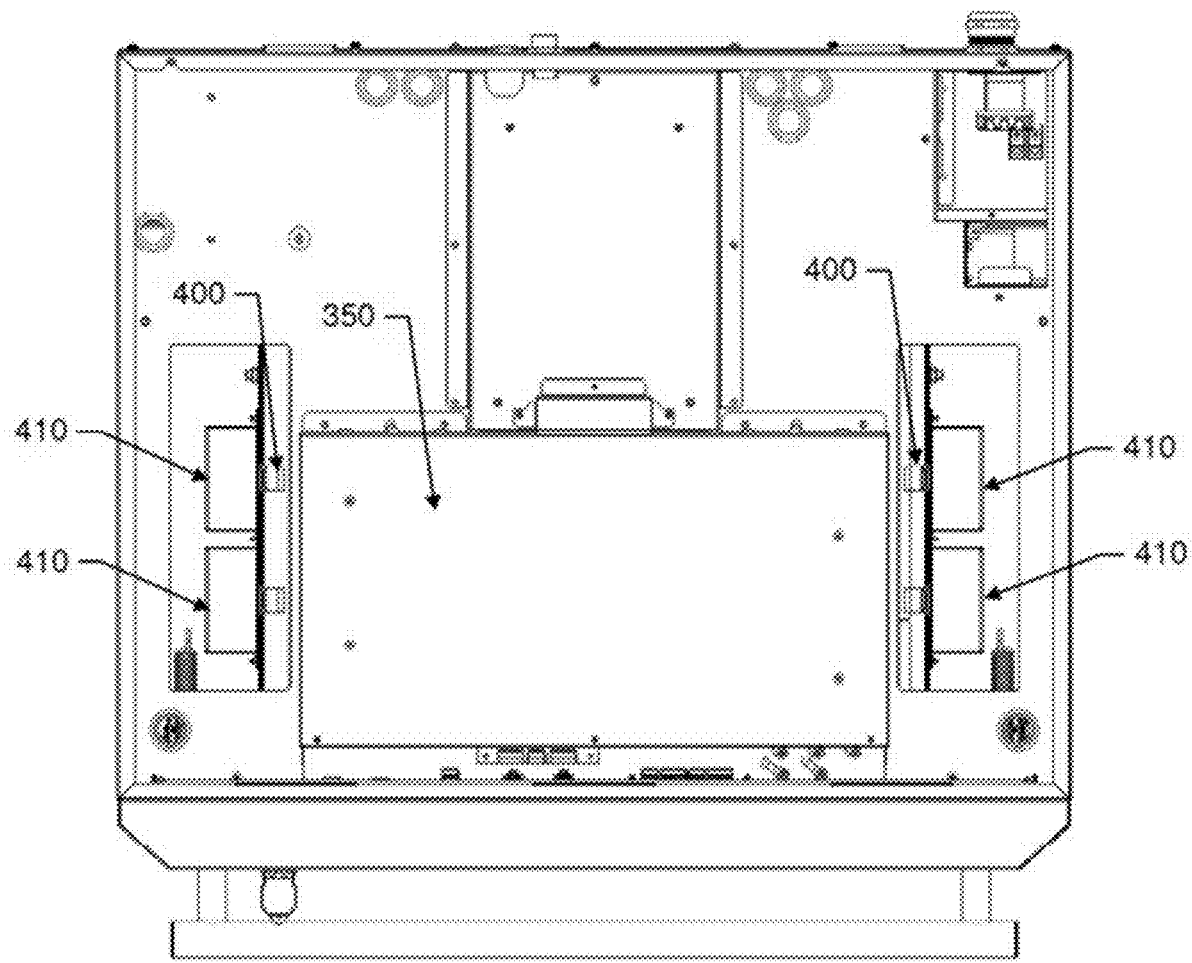
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above. In an example embodiment, each instance of the waveguide assembly 410 may have a corresponding RF entry point 420 located near a bottom portion of the waveguide and in a sidewall of the cooking chamber 102 (see FIG. 3) to provide the RF into the cooking chamber 102. A cover that is invisible to RF, but restricts the flow of air may be provided over the RF entry points 420. In an example embodiment, the RF entry points 420 may be at a predetermined height within the cooking chamber 102.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=$(P_{fwd}-P_{refl})/P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency.

Figure 5:
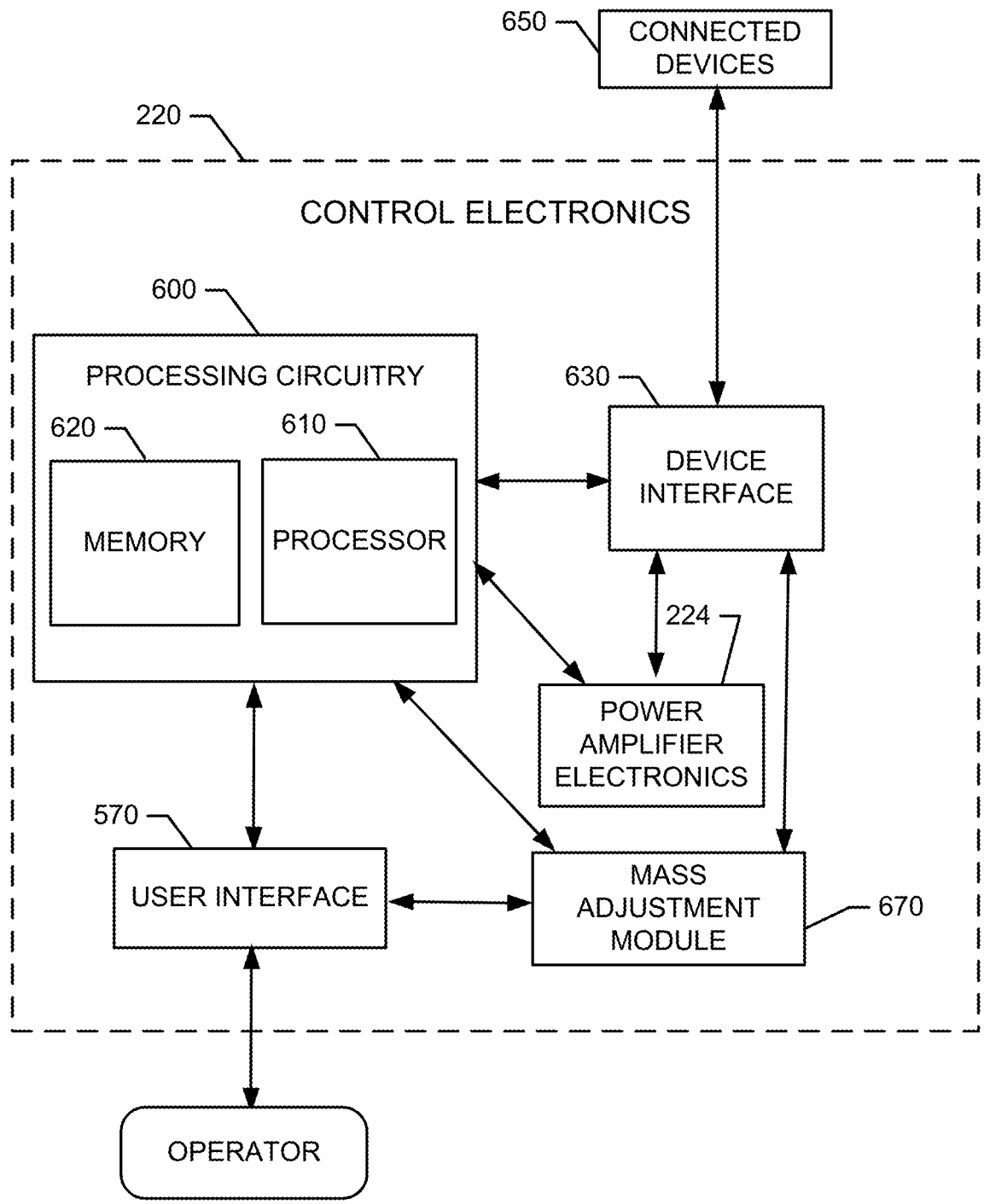
FIG. 5 is a block diagram of control electronics for providing the electronic circuitry for controlling RF application in the oven in accordance with an example embodiment.

FIG. 5 is a block diagram of control electronics 220 for providing the electronic circuitry for instantiation of power cycling during oven operation in accordance with an example embodiment. In some embodiments, the control electronics 220 may include or otherwise be in communication with processing circuitry 600 that is configurable to perform actions in accordance with example embodiments described herein. As such, for example, the functions attributable to the control electronics 220 may be carried out by the processing circuitry 600.

The processing circuitry 600 may be configured to perform data processing, control function execution and/or other processing and management services according to an example embodiment of the present invention. In some embodiments, the processing circuitry 600 may be embodied as a chip or chip set. In other words, the processing circuitry 600 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 600 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 600 may include one or more instances of each of a processor 610 and memory 620 that may be in communication with or otherwise control a device interface 630 and the user interface 570. As such, the processing circuitry 600 may be embodied as a circuit chip (e.g., an integrated circuit chip) configured (e.g., with hardware, software or a combination of hardware and software) to perform operations described herein. However, in some embodiments, the processing circuitry 600 may be embodied as a portion of an on-board computer.

The user interface 570 (which may be embodied as, include, or be a portion of the interface panel 106) may be in communication with the processing circuitry 600 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 630 may include one or more interface mechanisms for enabling communication with connected devices 650 such as, for example, other components of the oven 100, sensors of a sensor network of the oven 100, removable memory devices, wireless or wired network communication devices, and/or the like. In some cases, the device interface 630 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 630 may receive input at least from a temperature sensor that measures the temperatures described above, or receives input from any of the other parameters described above, in order to enable communication of such parameters to the processing circuitry 600 for the performance of certain protective or control functions. Alternatively or additionally, the device interface 630 may provide interface mechanisms for any devices capable of wired or wireless communication with the processing circuitry 600. In still other alternatives, the device interface 630 may provide connections and/or interface mechanisms to enable the processing circuitry 600 to control the various components of the oven 100.

In an exemplary embodiment, the memory 620 may include one or more non-transitory memory devices such as, for example, volatile and/or non-volatile memory that may be either fixed or removable. The memory 620 may be configured to store information, data, cooking programs, recipes, applications, instructions or the like for enabling the control electronics 220 to carry out various functions in accordance with example embodiments of the present invention. For example, the memory 620 could be configured to buffer input data for processing by the processor 610. Additionally or alternatively, the memory 620 could be configured to store instructions for execution by the processor 610. As yet another alternative, the memory 620 may include one or more databases that may store a variety of data sets responsive to input from the sensor network, or responsive to programming of any of various cooking recipes. Among the contents of the memory 620, applications may be stored for execution by the processor 610 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 610 and stored in memory 620 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 620 may store applications for defining responses to stimuli including the generation of protective actions and/or notification functions. In some embodiments, the memory 620 may store table values or instructions for calculations associated with ensuring that approximately a same amount of absorbed energy required for completion of a recipe is applied to a food product even after another food product is added into the cooking chamber during execution of the recipe and therefore changing the rate of absorption or RF energy into the respective food products as described herein.

The processor 610 may be embodied in a number of different ways. For example, the processor 610 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 610 may be configured to execute instructions stored in the memory 620 or otherwise accessible to the processor 610. As such, whether configured by hardware or by a combination of hardware and software, the processor 610 may represent an entity (e.g., physically embodied in circuitry—such as in the form of processing circuitry 600) capable of performing operations according to example embodiments of the present invention while configured accordingly. Thus, for example, when any instance of the processor 610 is embodied as an ASIC, FPGA or the like, the processor 610 may be specifically configured hardware for conducting the operations described herein. Alternatively, as another example, when the processor 610 is embodied as one or more executors of software instructions, the instructions may specifically configure the processor 610 to perform the operations described herein.

In an example embodiment, the processor 610 (or the processing circuitry 600) may be embodied as, include or otherwise control the control electronics 220 and/or the power amplifier electronics 224. As such, in some embodiments, the processor 610 (or the processing circuitry 600) may be said to cause each of the operations described in connection with the control electronics 220 and/or the power amplifier electronics 224 by directing the control electronics 220 and/or the power amplifier electronics 224, respectively, to undertake the corresponding functionalities responsive to execution of instructions or algorithms configuring the processor 610 (or processing circuitry 600) accordingly. As an example, the control electronics 220 may be configured to control the responses to various stimuli associated with executing the learning procedure discussed above and directing RF application within the oven 100 based on the learning procedure. Moreover, the control electronics 220 may be configured to determine efficiency parameters and take protective actions based on the efficiency parameters, or based on individual ones of the values, measurements and/or parameters that are determined by or received at the control electronics 220 for execution of the learning procedure. In some cases, a separate instance of a processor (or processors) and memory may be associated with different parts of the control electronics 220 (e.g., including separate processors for the control of the power amplifier electronics 224 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions. The control electronics 220 may also execute instructions for calibration and/or fault analysis. Accordingly, for example, the control electronics 220 may be configured to act locally to protect the power amplifier electronics 224 via stopping RF application to the cooking chamber 102, via making adjustments to components to provide calibrated outputs, and/or via alerting the user when various abnormal or correctable situations are detected. The control electronics 220 may also manage performance of calculations associated with ensuring that approximately the same amount of absorbed energy required for completion of a recipe is applied to a food product even after another food product is added into the cooking chamber during execution of the recipe and therefore changing the rate of absorption or RF energy into the respective food products as described herein.

In some embodiments, efficiency calculations may be made periodically throughout the cooking process as part of a learning process. In this regard, the control electronics 220 may be configured to extrapolate, calculate or otherwise determine the amount of energy to be directed into food product (i.e., forward power value 520), and the amount of energy reflected back from the cooking chamber 102 (i.e., the reflected power value 522) so that an accurate estimate of the absorbed power (or energy) can be estimated, and the efficiency parameter can be determined. The control electronics 220 may then control operation of the RF generator 204 and/or the antenna assembly 130 based on the measured efficiency as part of a calibration or cooking process. Thus, for example, if a learning process is performed during cooking, the measured efficiency may be expected to be at least above a threshold value (e.g., 40%) whenever there is a food product or load in the cooking chamber 102. If efficiency is below the threshold value, the control electronics 220 may communicate with the user interface 570 to let the user know to check the cooking chamber 102 to make sure that there is a load therein. Discrete efficiency measurements may be made at any desirable interval (e.g., every 100 msec) to perform the protective or alert functions described herein. If reflected power is very high, the power amplifier electronics 224 may be shutdown. If certain temperatures of components (e.g., one or both of the heat sinks 352, the processor 610, or air temperatures) are too high, an alarm may be provided through the user interface 570 and/or the power amplifier electronics 224 may be shutdown. Other protective actions are also possible.

The control electronics 220 described above may be appreciated to have a capability for coordinating the application of RF energy and convective energy for cooking a food product both quickly and with precision with respect to the level of doneness or other resultant or expectant cooking output. The control electronics 220 may also be able to handle various dynamic inputs as part of the coordinating described above. However, as noted above, one dynamic input that is typically more disruptive is a modification to the mass of food product being cooked. In this regard, the recipe and corresponding algorithms selected for cooking generally consider a mass of food product to be fixed during the execution of the recipe. Where changes are accounted for, such changes may refer to phase changes or loss of mass due to evaporation, and the changes may be inherently accommodated by the recipe. However, distinct mass changes (e.g., by removing food items or adding food items) during execution of a recipe generally remains a disruptive event since the removal or addition of food items typically results in a proportionally significant change in the mass in which RF energy is to be absorbed. If mass is removed, the RF energy applied will be absorbed at a much higher level in the mass that remains than otherwise planned. The food product will be cooked too fast, or at least much faster than otherwise planned. Meanwhile, if mass is added, the RF energy applied will be absorbed in a diluted fashion in the higher mass that is present, and the food product will be cooked more slowly than otherwise planned.

To account for dynamic inputs that include changes to mass of the food product being cooked, example embodiments may employ a mass adjustment module 670. The mass adjustment module 670 may be may be any means such as a device or circuitry operating in accordance with software or otherwise embodied in hardware or a combination of hardware and software (e.g., processor 610 operating under software control, the processor 610 embodied as an ASIC or FPGA specifically configured to perform the operations described herein, or a combination thereof) thereby configuring the device or circuitry to perform the corresponding functions of the mass adjustment module 670 as described herein. In this regard, the mass adjustment module 670 may be configured to enable modifications to the mass of the food product being cooked to be changed in the middle of execution of a recipe. In some cases, the modification may be permitted only if the added (or subtracted) mass is an adjustment made for cooking according to the same recipe. In other words, for example, if a 6 Oz chicken breast is being cooked, adding a second chicken breast (or more) may be permissible and accounted for by the mass adjustment module 670.

In an example embodiment, the mass adjustment module 670 may treat each positive modification to the mass of the food product being cooked (e.g., the addition of additional items) as the creation of a separate trackable batch of the same recipe. Following the example above, the first chicken breast (already being cooked) would be considered to be a first batch (or first instance or count) of the selected recipe, and the addition of a second chicken breast (or multiple chicken breasts for that matter) at some time during the execution of the recipe will create a second batch of one (or multiple) chicken breasts. Given that the recipe is generally the same for both batches (e.g., the same fan speed, temperature of the cooking chamber 102, and RF power level), the mass adjustment module 670 may account for the additional batch, and the corresponding effect of the additional mass on RF absorption to modify the nominal time associated with the recipe to proportionally account for the changed rate of absorption. In an example embodiment, the mass adjustment module 670 may be configured to mathematically compute the proportional changes to RF absorption based on the mass change inserted, and adjust the time over which the recipe would normally operate for each batch to account for any periods of overlapping cooking between the batches by increasing (for added mass) the cooking time to achieve the same total energy absorption that would otherwise be achieved if there were not simultaneously cooking batches in the cooking chamber 102.

Thus, for example, if a recipe calls for a first item to be cooked for one more minute, but a second item is added to define a second batch. If the second item is the same mass as the first item, then each item will (for the remaining minute in the nominal recipe) only absorb approximately half of the RF energy that would otherwise be expected to be absorbed. To account for this change, the mass adjustment module 670 may extend the length of cooking of the first item for an additional minute, thereby ensuring that the same amount of energy that would have been absorbed in the first item over one minute without the second item can be absorbed in the first item over two minutes of overlapping cooking time with the second item. The second item will also have the cooking time for its recipe extended to account for the fact that its first two minutes of cooking were conducted in an environment where another item (i.e., the first item) absorbed approximately ½ of the RF energy that would have otherwise been absorbed in the second item. As such, the first two minutes for the second batch will be treated only as a single minute of time relative to the nominal recipe time for the second batch. Accordingly, the mass adjustment module 670 adjusts the nominal recipe cooking time to proportionally account for mass changes that result in RF absorption changes within the food product or items being cooked in separate batches (i.e., separate instances of items having corresponding different start and finish times although being cooked simultaneously over at least a portion of overlapping time).

More generically, the mass adjustment module 670 may be configured to determine a first proportion of a mass of the first item relative to a total mass including the first and second items and a second proportion of a mass of the second item relative to the total mass. The overlap period when the different rates of absorption are applicable may be determined as a time remaining in a nominal cooking time for the first batch when the second batch is added divided by the first proportion. The time remaining for the cooking of the second item to be complete may be considered to be a completion time, which may be determined as the nominal cooking time for the second item minus a product of the second proportion and the overlap period. This process can be performed any additional number of times to manage simultaneous cooking of multiple different batches all with different starting, overlapping and finishing times, which are managed by the mass adjustment module 670.

For example, consider a case in which the first item is twice as massive as the second item (e.g., due to the first item being a pair of chicken breasts, and the second item being a single chicken breast) and the second item is added to a five minute nominal recipe time for cooking the first item at the four minute mark. Normally, the first item would be fully cooked in one more minute. However, the first item is now only 67% of the total mass of the updated load mass when the second item is added (the second item being 33% of the total mass). Rather than a single minute, the first item must actually be cooked a minute and a half (i.e., 1 minute divided by 0.67) to account for the reduced absorption rate. The minute and a half value defines the overlap period where reduced absorption applies to both the first item and the second item. Meanwhile, in this case, the second item would typically need 2.5 minutes to fully cook at the nominal recipe time since the second item is half as massive as the first item. However, during the 1.5 minute overlap period, the second item will absorb only ⅓ of what it would normally absorb due to the presence of the first item. So the 1.5 minute overlap period only effectively accounts for 0.5 minutes worth of absorption relative to the nominal recipe time of 2.5 minutes for the second item. The completion time may therefore be calculated as the nominal recipe time of 2.5 minutes minus a product of the overlap period (1.5 minutes) and the proportion (0.33) of the total mass that is attributable to the second item. The resulting value is 2 minutes. Thus, after the 1.5 minutes of overlap period, the second item will cook by itself for an additional two minutes to achieve the same energy absorption amount needed to fully cook the mass of the second item according to the recipe.

The mass adjustment module 670 may be operable based on user inputs provided via the user interface 570. Although many different specific ways of presenting specific interface consoles or controls may be provided, some examples of interfaces to illustrate operation of the mass adjustment module 670 are shown in FIGS. 6-9. It will be appreciated that FIGS. 6-9 are provided by way of example and not limitation.

Figure 6:
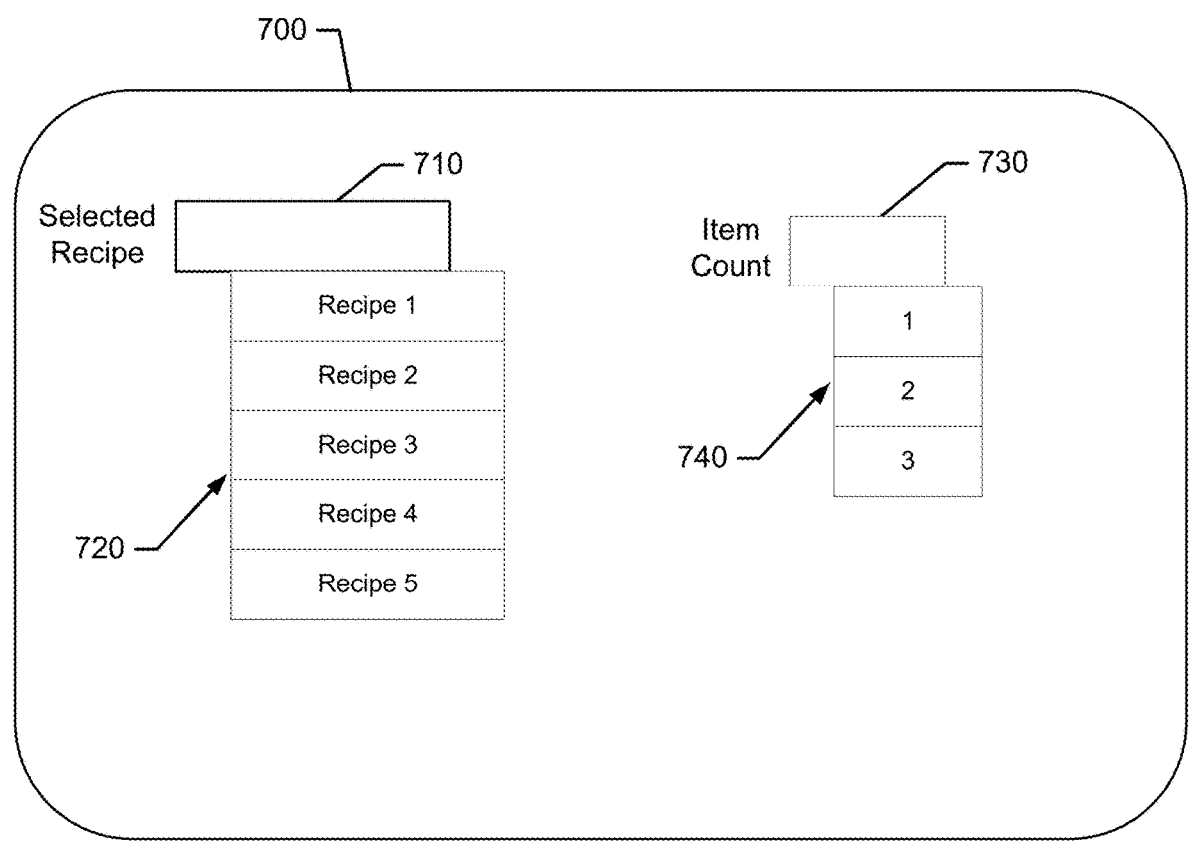
FIG. 6 illustrates a control console interface for selecting a recipe in accordance with an example embodiment.

Referring now to FIGS. 6-9, an interface console 700 is shown in FIG. 6 to provide an ability to define a batch by selecting a recipe and indicating a mass of the food product to be cooked. In some examples, the recipe may be specific to the type of food product being cooked. Thus, for example, the recipe may define whether the type of food product being cooked is a pastry or protein (e.g., fish, chicken, beef, pork, etc.) along with a nominal size of a single count or item of the corresponding type of food product being cooked. In the depicted example of FIG. 6, the interface console 700 may include a recipe selection box 710 that, when touched, may present a recipe list 720 from which one of the options of the recipe list 720 may be selected (e.g., by touch) as the selected recipe. Thereafter, the user may utilize an item count box 730 (again by touch) to access an item count list 740. One of the options for item count may then be selected from the item count list 740 to define the selected item count. The example of FIG. 6 relates to a touch screen interface. However, it will be appreciated that other selection methods may be used including a mouse, keyboard, keypad, selector dial, switches, buttons, etc.

Figure 7:
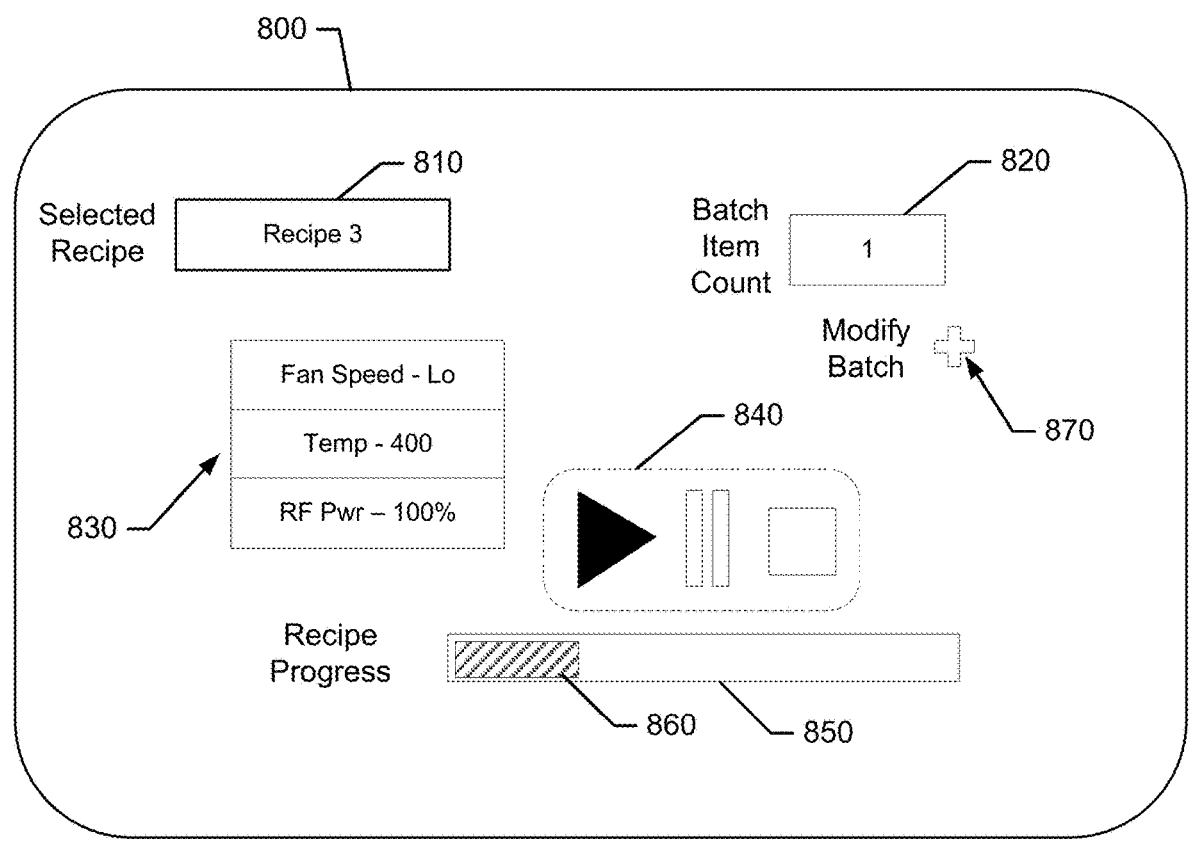
FIG. 7 is a recipe execution interface that allows adding items during a cooking process in accordance with an example embodiment.

After desired selections are made by the user via the interface console 700 of FIG. 6, a recipe execution interface 800 may be displayed as shown in FIG. 7. The recipe execution interface 800 may indicate the selected recipe 810 and the selected item count 820 corresponding to the selected recipe 810. The recipe execution interface 800 may also provide recipe specific oven settings 830. The oven settings 830 may include settings for fan speed, temperature (of the cooking chamber 102), and RF power level. However, in alternative embodiments, other or additional operational parameters may be included in the oven settings 830.

The recipe execution interface 800 may also include an action selector 840. In this example, the action selector 840 includes selectable symbols for start (or cook), pause, and stop operations. A selected one of the symbols may be highlighted to indicate its having been actively selected. However, other presentation and selection paradigms are also possible, including dedicated buttons, a single selectable operator, or many other possible specific instantiations of action selectors. When the action selector 840 is actuated to initiate cooking, a recipe progress indicator 850 may be used to track progress relative to completion of the selected recipe 810. The recipe progress indicator 850 may, in some cases, provide a textual or other indication of the full time commitment associated with execution of the selected recipe 810. Meanwhile, a status indicator 860 may be provided with the recipe progress indicator 850 to demonstrate what portion of the full time commitment associated with execution of the selected recipe 810 has already been executed. In the depicted example, the status indicator 860 is a bar that grows in size proportional to the fraction of the full time commitment associated with execution of the selected recipe 810 that has transpired. Thus, for example, if the selected recipe 810 calls for a 5 minute full time commitment, the entire space of the recipe progress indicator 850 may represent 5 minutes. Meanwhile, the status indicator 860, which fills about 20% of the recipe progress indicator 850, may indicate that about one minute (or 20% of 5 minutes) has transpired toward completion of the selected recipe 810. In some cases, the status indicator 860 may include text defining a percentage completion and/or defining elapsed time (e.g., in hours, minutes and/or seconds).

Figure 8:
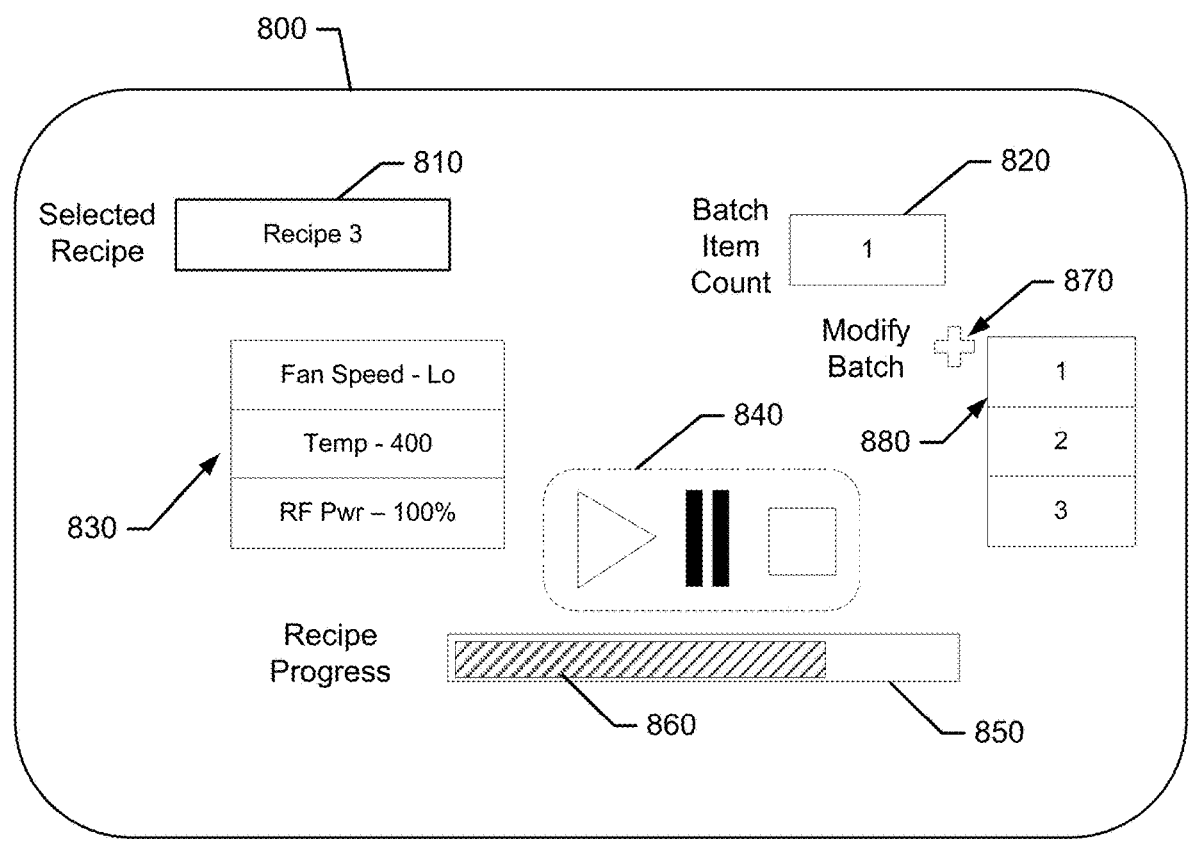
FIG. 8 is the recipe execution interface in the process of adding items in accordance with an example embodiment.

As noted above, the inclusion of the mass adjustment module 670 may enable the user to create a new batch and add additional items into the cooking chamber 102 while execution of a recipe is in progress. In an example embodiment, a batch modification selector 870 may be provided to be selectable by the user to enable the user to avail himself/ herself of this capability. For example, selection of the batch modification selector 870 may enable the user to define a second batch with a corresponding selection of an item count for the second batch. FIG. 8 shows the provision of a second batch count list 880 via which the user may select a count for the number of items that will be included in the second batch. In some cases, selection of the batch modification selector 870 may pause the cooking process until the second batch is defined and cooking is resumed (e.g., via the action selector 840). However, in other cases, the cooking process may pause when the door 104 is opened to insert the items of the second batch.

Figure 9:
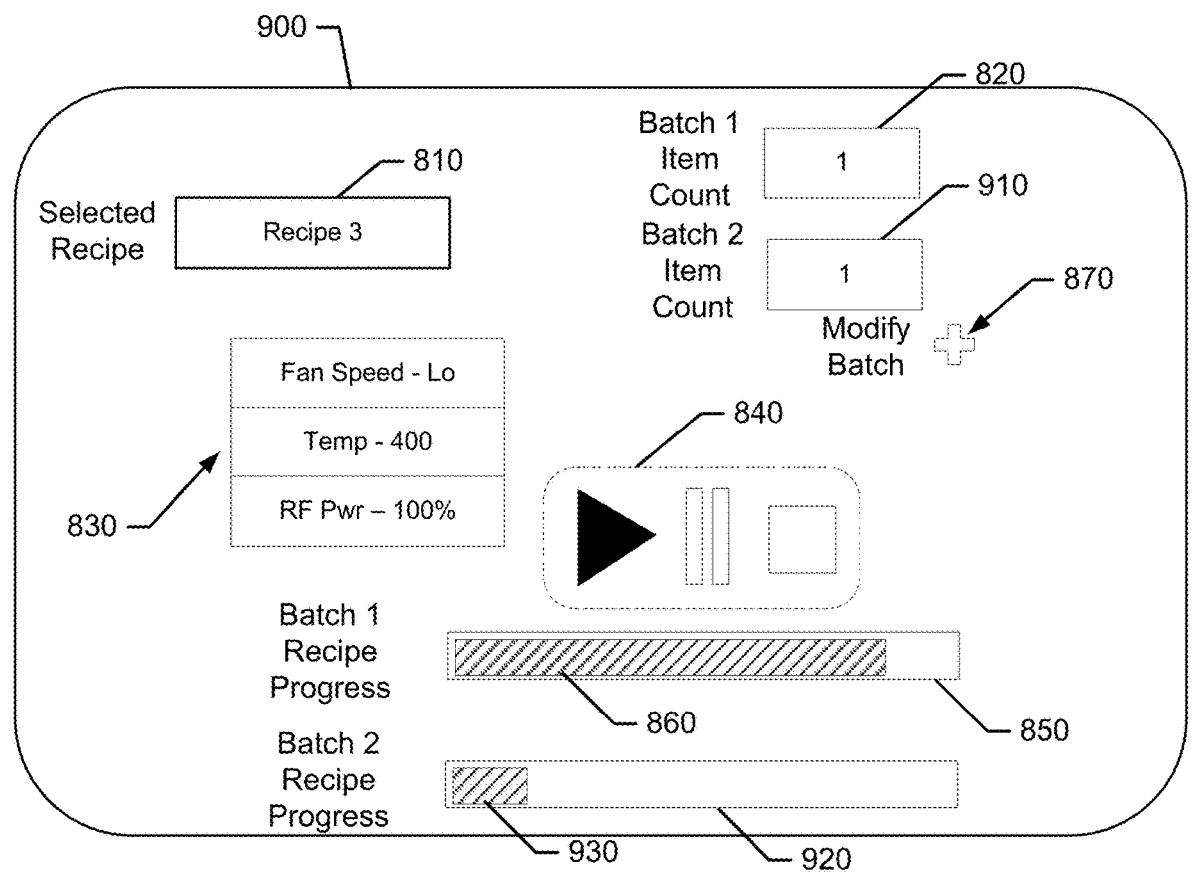
FIG. 9 illustrates the recipe execution interface tracking two batches in accordance with an example embodiment.

In an example embodiment, when the second batch has been defined, the mass adjustment module 670 may perform calculations (as described above) to determine a modification to the nominal execution time of the selected recipe 810 based on the change in mass of the food product due to the addition of the second batch. The mass adjustment module 670 may then also track each of the first and second batches separately according to the modification to the nominal execution time for each of the first and second batches. In this regard, FIG. 9 shows a recipe execution interface 900 for simultaneous execution of the recipe on two batches (i.e., the first batch and the second batch). The second batch count list 880 of FIG. 8 has been set to one to define the selected item count 910 for the second batch. Additionally, the recipe progress indicator 850 and status indicator 860 for the first batch are accompanied by a recipe progress indicator 920 and status indicator 930 for the second batch. The length of the recipe progress indicators 850 and 920 for the first and second batches, respectively, may be adjusted in total length to account for the increased time needed to achieve the same absorption of RF energy in the food product of each respective batch that would otherwise be achieved without simultaneous operation of the recipe on each batch. The status indicators 860 and 930 may also represent the updated fraction of the total adjusted length.

Figure 10:
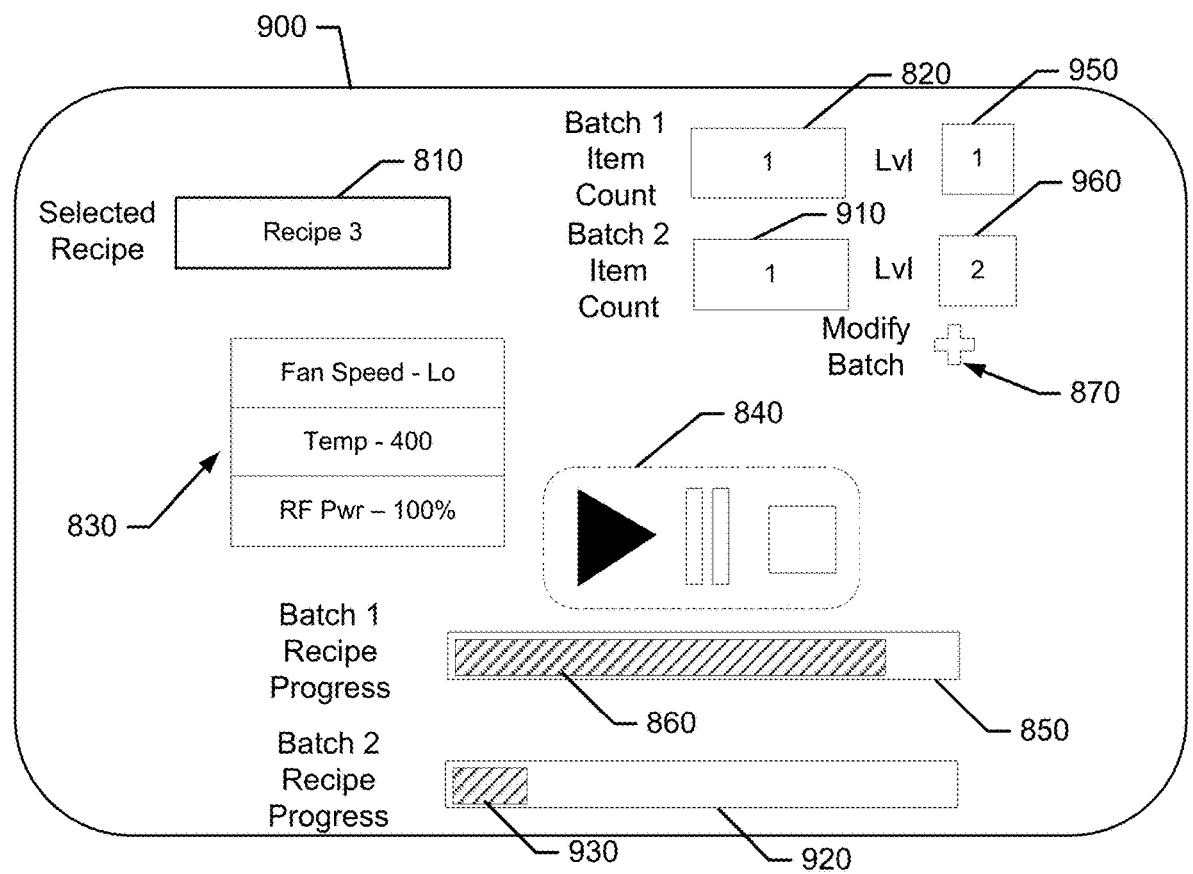
FIG. 10 illustrates the recipe execution interface tracking batches with location specific item placement in accordance with an example embodiment.

In some embodiments, the item counts for food products associated with any particular batch may be assumed to be placed in a central location within the cooking chamber 102. However, in some cases, more specific locations may be defined or preferred. For example, if multiple racks or levels are provided in the cooking chamber 102, then an indication of the location of the items in a batch may further be specified. FIG. 10 illustrates an example where location may be specified. In this regard, the food item of the first batch may be on level 1, as indicated by first batch location indicator 950, and the food item of the second batch may be on level 2, as indicated by second batch location indicator 960. To any extent absorption of RF or cooking speed is dependent upon the level (or other location) that is specified, the mass adjustment module 670 may also be configured to make modification calculations in consideration of the rates of absorption of RF associated with (or specified to) the location specified for the food product.

In an example embodiment, an oven (and/or control electronics associated with controlling operations of the oven) may be provided. The oven may include a cooking chamber configured to receive a first food product, a convective heating system configured to provide heated air into the cooking chamber, a radio frequency (RF) heating system configured to provide RF energy into the cooking chamber, and processing circuitry configured to execute a recipe defining cooking parameters for cooking the first food product. The cooking parameters may define operational settings for the convective heating system and the RF heating system and a nominal cooking time for a first batch including the first food product. The processing circuitry may be operably coupled to a mass adjustment module configured to determine, based on an indication of an addition of a second batch comprising a second food product to the cooking chamber, an overlap period during which the first and second food products are simultaneously cooked and a completion time for cooking the second food product after the overlap period.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the mass adjustment module may be configured to determine a first proportion of a mass of the first food product relative to a total mass including the first and second food products and a second proportion of a mass of the second food product relative to the total mass. In an example embodiment, the mass adjustment module may be configured to determine the overlap period or the completion time based at least in part on the first proportion or the second proportion. In some cases, the overlap period may be determined as a time remaining in a nominal cooking time for the first batch when the second batch is added divided by the first proportion. In an example embodiment, the completion time may be determined as a nominal cooking time for the second item minus a product of the overlap period and the second proportion. In some cases, the mass adjustment module may be configured to graphically display a first status indicator associated with cooking the first batch and a second status indicator associated with cooking the second batch. In an example embodiment, the first and second status indicators may each be displayed in reference to a first full time commitment associated with cooking the first batch and a second full time commitment associated with cooking the second batch. In some cases, the first full time commitment may be the nominal cooking time minus the time remaining plus the overlap period, and the second full time commitment may be the overlap period plus the completion time. In an example embodiment, the mass adjustment module may be configured to enable a quantity of items associated with each of the first and second batches to be defined via a user interface operably coupled to the processing circuitry. In some cases, the user interface is configured to provide a location selection associating each of the first batch and the second batch with a corresponding location within the cooking chamber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a first food product;
a convective heating system configured to provide heated air into the cooking chamber;
a radio frequency (RF) heating system configured to provide RF energy into the cooking chamber; and
processing circuitry configured to execute a recipe defining cooking parameters for cooking the first food product, the cooking parameters defining operational settings for the convective heating system and the RF heating system and a nominal cooking time for a first batch including the first food product,
wherein the processing circuitry includes or is operably coupled to a mass adjustment module configured to determine, based on an indication of an addition of a second batch comprising a second food product to the cooking chamber, an overlap period during which the first and second food products are simultaneously cooked and a completion time for cooking the second food product after the overlap period.

2. The oven of claim 1, wherein the mass adjustment module is configured to determine a first proportion of a mass of the first food product relative to a total mass including the first and second food products and a second proportion of a mass of the second food product relative to the total mass.

3. The oven of claim 2, wherein the mass adjustment module is configured to determine the overlap period or the completion time based at least in part on the first proportion or the second proportion.

4. The oven of claim 2, wherein the overlap period is determined as a time remaining in a nominal cooking time for the first batch when the second batch is added divided by the first proportion.

5. The oven of claim 4, wherein the completion time is determined as a nominal cooking time for the second item minus a product of the overlap period and the second proportion.

6. The oven of claim 1, wherein the mass adjustment module is configured to graphically display a first status indicator associated with cooking the first batch and a second status indicator associated with cooking the second batch.

7. The oven of claim 6, wherein the first and second status indicators are each displayed in reference to a first full time commitment associated with cooking the first batch and a second full time commitment associated with cooking the second batch.

8. The oven of claim 7, wherein the first full time commitment is the nominal cooking time minus the time remaining plus the overlap period, and
wherein the second full time commitment is the overlap period plus the completion time.

9. The oven of claim 1, wherein the mass adjustment module is configured to enable a quantity of items associated with each of the first and second batches to be defined via a user interface operably coupled to the processing circuitry.

10. The oven of claim 9, wherein the user interface is configured to provide a location selection associating each of the first batch and the second batch with a corresponding location within the cooking chamber.

11. Control electronics for controlling application of radio frequency (RF) energy generated using solid state electronic components and a convective heating system configured to provide heated air into a cooking chamber, the control electronics comprising,
processing circuitry configured to execute a recipe defining cooking parameters for cooking a first food product in the cooking chamber, the cooking parameters defining operational settings for the convective heating system and the RF heating system and a nominal cooking time for a first batch including the first food product; and
a mass adjustment module operably coupled to the processing circuitry and configured to determine, based on an indication of an addition of a second batch comprising a second food product to the cooking chamber, an overlap period during which the first and second food products are simultaneously cooked and a completion time for cooking the second food product after the overlap period.

12. The control electronics of claim 11, wherein the mass adjustment module is configured to determine a first proportion of a mass of the first food product relative to a total mass including the first and second food products and a second proportion of a mass of the second food product relative to the total mass.

13. The control electronics of claim 12, wherein the mass adjustment module is configured to determine the overlap period or the completion time based at least in part on the first proportion or the second proportion.

14. The control electronics of claim 12, wherein the overlap period is determined as a time remaining in a nominal cooking time for the first batch when the second batch is added divided by the first proportion.

15. The control electronics of claim 14, wherein the completion time is determined as a nominal cooking time for the second item minus a product of the overlap period and the second proportion.

16. The control electronics of claim 11, wherein the mass adjustment module is configured to graphically display a first status indicator associated with cooking the first batch and a second status indicator associated with cooking the second batch.

17. The control electronics of claim 16, wherein the first and second status indicators are each displayed in reference to a first full time commitment associated with cooking the first batch and a second full time commitment associated with cooking the second batch.

18. The control electronics of claim 17, wherein the first full time commitment is the nominal cooking time minus the time remaining plus the overlap period, and
wherein the second full time commitment is the overlap period plus the completion time.

19. The control electronics of claim 11, wherein the mass adjustment module is configured to enable a quantity of items associated with each of the first and second batches to be defined via a user interface operably coupled to the processing circuitry.

20. The control electronics of claim 19, wherein the user interface is configured to provide a location selection associating each of the first batch and the second batch with a corresponding location within the cooking chamber.

* * * * *